C. O. PALMER.
ROTATING DEVICE FOR ROCK DRILLS.
APPLICATION FILED AUG. 26, 1910.
1,153,700. Patented Sept. 14, 1915.
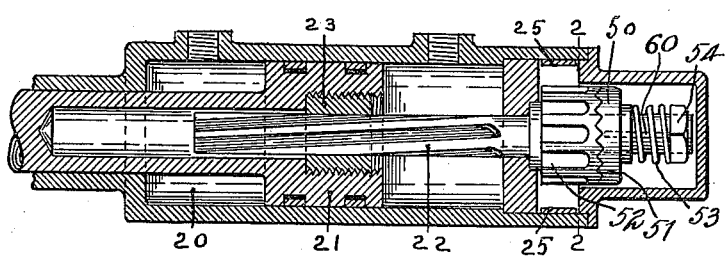 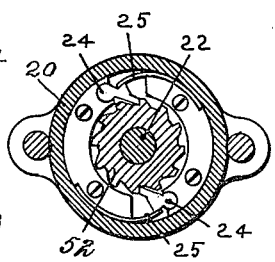
Fig. 1.   Fig. 2.
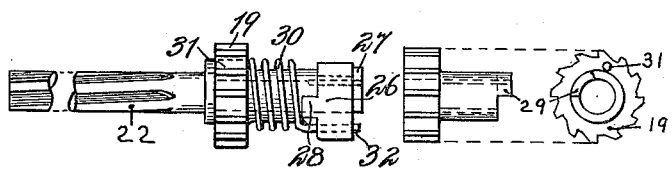 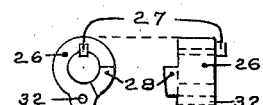
Fig. 3.   Fig. 4.   Fig. 5.
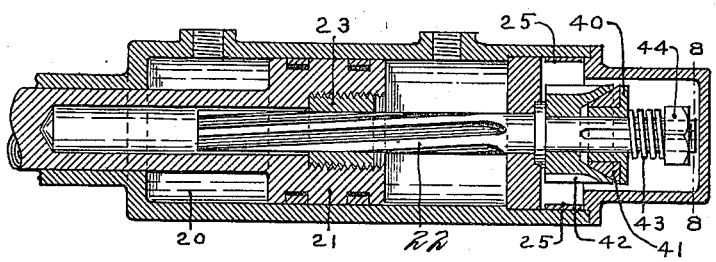 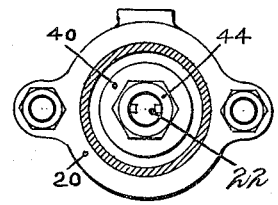
Fig. 7.   Fig. 8.
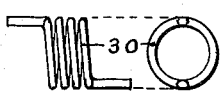 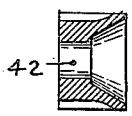 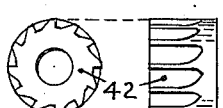 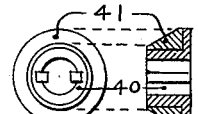
Fig. 6.   Fig. 9.   Fig. 10.   Fig. 11.
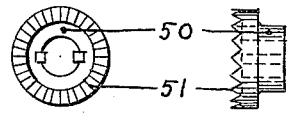
Fig. 12.
Witnesses:
W. E. Thomas
Gies Thomas
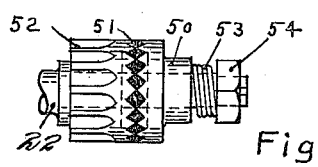
Fig. 13.
Fig. 14.
Inventor:
C. O. Palmer.
COLUMBIA PLANOGRAPH CO., WASHINGTON, D. C.

UNITED STATES PATENT OFFICE.

CHARLES OTIS PALMER, OF CLEVELAND, OHIO.

ROTATING DEVICE FOR ROCK-DRILLS.

1,153,700.   Specification of Letters Patent.   Patented Sept. 14, 1915.

Application filed August 26, 1910. Serial No. 579,165.

*To all whom it may concern:*

Be it known that I, CHARLES OTIS PALMER, a citizen of the United States of America, residing at Cleveland, in the county of Cuyahoga and State of Ohio, have invented certain new and useful Improvements in Rotating Devices for Rock-Drills; and I hereby declare the following to be a full, clear, and exact description of the invention, such as will enable others skilled in the art to which it pertains to make and use the same.

My invention relates to rock drills and tools of similar nature and has for its object to provide a rotating device which shall exert sufficient force to rotate the drill under normal working conditions, but will avoid breaking the tool, in case it should require abnormal force for its rotation as is sometimes the case.

One of the best means for rotating a drill of this class, has been found to consist of a rifle-bar suitably associated with the reciprocatory piston, but hitherto the means employed for retaining the rifle-bar itself yieldingly against rotation has been by some friction drive that was variable in its action unless altered occasionally by manual adjustment. To gain access to this adjustment when inclosed, required the removal of the cover with its air tight joint. Or else the packing of the stem to prevent the escape of the air where the adjustment was outside the shell. By my invention the spring under tension produces practically constant torsional resistance, notwithstanding the wear of the friction washers.

In my construction I have preferably adopted a ratchet wheel having relatively large strong teeth which react against stationary detents; in association with which I employ a spring-controlled means for obtaining a yielding connection with the rifle-bar.

My invention further consists in putting the ratchet wheel loose on the rifle-bar, and interposing between them, certain elastic pressure devices that engage both the rifle-bar and the ratchet wheel, and prevent movement between them when the normal torsional force is exerted, but which yields when this normal torsional force is somewhat exceeded. This predetermined resistance to movement between the elements above mentioned is preferably secured by a clutch whose elements are held in yielding engagement by a helical spring, as will hereafter be set forth.

In the accompanying drawings Figure 1 is a vertical longitudinal section of a rock drill equipped with my device using a corrugated rosette clutch whose elements are held in engagement by a helical spring; Fig. 2 is a section on line 2—2 of Fig. 1 showing the pawls that engage the ratchet wheel; Fig. 3 shows a rifle-bar equipped with a clutch whose elements are held in working engagement by the winding up of the helical spring 30; Fig. 4 shows side and end details of the ratchet wheel of Fig. 3; Fig. 5 shows similar details of the rifle-bar collar of Fig. 3; Fig. 6 is a detail of the ratchet wheel spring of Fig. 3; Fig. 7 is a vertical longitudinal section of a rock drill equipped with my device in which a cone clutch backed by a spring is used to limit the torsional force to rotate the drill; Fig. 8 is a section on line 8—8 of Fig. 7; Fig. 9 is a detailed longitudinal section of the ratchet wheel shown in Fig. 9; Fig. 10 is a detailed side and end view of the ratchet wheel 42 of Fig. 9; Fig. 11 shows similar details of the clutch of Fig. 7; Fig. 12 shows a side view of the sliding rosette collar; Fig. 13 is an end view of the sliding rosette collar; Fig. 14 shows the rosette clutch in the act of slipping the engagement with the ratchet wheel.

Similar characters denote similar parts throughout the several views.

My invention is here shown in connection with a rock drill cylinder that has no valve and is operated by reciprocating columns of air. But the invention is equally applicable to those rock drills that are provided with an air valve.

In the cylinder 20 of Fig. 1 reciprocates the piston 21 that mounts the drilling tool in a well known manner. Sliding longitudinally in the piston head is the rifle-bar 22 that engages the rifle-nut 23 secured in the piston in the ordinary manner. The ratchet wheel 52 is made separate from the rifle-bar 22 on which it is fitted to rotate. The pawls 24—24 are caused to engage the ratchet wheel 52 by the springs 25—25 as shown in Fig. 2, and prevent its backward rotation.

The normal operation being the same for all figures is as follows: When the piston moves forward (or strikes a blow) the rifle-bar 22 rotates with the ratchet wheel 52 in a clockwise direction; permitted by the pawls 24 that engage it. The piston, however, does not rotate appreciably as there is no force applied thereto, causing it to do so. On the return or backward stroke of the piston the pawls 24 prevent the ratchet wheel 52 and the rifle-bar from turning backward, so the rifle-bar remains stationary and the piston is given a partial revolution by the spiral groove in the rifle-bar, engaging the rifle-nut 23 in the piston. Thus the turning is continued in a step by step motion, at each backward stroke of the piston. But occasionally it happens that on account of a seam in the rock or other cause, it may require such unusual force to rotate the drill as might break some part of the rotative mechanism. To prevent this, the ratchet wheel 52 is made separate from the rifle-bar 22, on which it is mounted.

The yielding device between the ratchet wheel and rifle-bar may vary in its details. In Fig. 1 the ratchet wheel 52 is combined with a rosette collar 50 that normally is kept in contact with the ratchet wheel 52 by the spring 53. The sliding collar 50 is splined to the rifle-bar 22. The surface of the teeth 51 are formed slanting so that when a sufficient torsional force is applied to the ratchet wheel the sliding collar 50 is pushed longitudinally on the rifle-bar out of engagement with the ratchet wheel (see Fig. 14). The magnitude of the force that is required to slide the collar 50 out of engagement is governed by the tension of the spring 53 and the inclination of the teeth of the clutch 51. These are so adjusted as to allow the rifle-bar to rotate in both directions inside the ratchet wheel 52 when the rotative effort is somewhat in excess of the normal working force.

In Fig. 7 the cone 40 is splined onto the rifle bar, to prevent rotation and is preferably faced with fiber 41 to increase the friction where it bears against the recessed ratchet wheel 42. The degree of tension of the spring 43 limits the rotative force applied to the rifle-bar and eliminates the frequent adjustment of the frictional pressure. The pawls that engage the ratchet, are the same as shown in Fig. 2, or may be any other suitable kind known in the art. If from any cause, the torsional force required to rotate the drill becomes excessive, the cone 40 slips in the ratchet wheel 42 and allows the rifle bar to turn in the reverse direction, from that allowed by the pawls.

Figs. 3, 4, 5 and 6 illustrate a clutch whose teeth 28 and 29 are held in normal engagement by the winding up of spring 30. The collar 26 is secured on the end of the rifle-bar by the key 27. Formed on the collar 26 is the tooth 28 that engages with the corresponding tooth 29 on the ratchet wheel 19. The spring 30 has one end secured in the hole 31 of the ratchet wheel and the other end in the hole 32 of the collar 26. The spring 30 is placed under sufficient initial tension to keep the teeth 28 and 29 in driving contact when the rifle-bar exerts the torsional force necessary for the normal rotation of the drill. But if it should exert a greater force to rotate the drill than that given by such initial tension to wind up the spring to its normal working tension, the spring will be wound still tighter and the teeth 28 and 29 will be separated by the rifle-bar rotating in both directions inside the ratchet wheel without revolving the drill. But the rifle-bar and mechanism of rotation will thus be saved from the breaking strain which they would otherwise receive, pursuant to the object of this invention.

Other forms of clutches as well as other forms of springs will readily suggest themselves to those versed in the art, for adaptation to my invention, above explained.

Having thus described my invention, I claim:

1. In machines of the class described the combination with the actuating cylinder, of a piston in said cylinder, a rotating device consisting of a rifle-bar engaging said piston, a ratchet-wheel loosely mounted upon said rifle-bar, a pawl engaging the ratchet wheel and allowing its rotation in one direction only, a driving engagement consisting of a sleeve on said rifle-bar non-revoluble therewith and engaging said ratchet wheel, and a spring holding said ratchet wheel and sleeve in forced engagement under normal working stress but allowing their disengagement when abnormal torsional stress is applied to separate said engaging parts.

2. In a rock drill the combination with the actuating cylinder, of a piston in said cylinder, a rotating device consisting of a rifle-bar engaging said piston, a ratchet-wheel loosely mounted on the rifle-bar, yielding clutch elements interposed between the ratchet-wheel and rifle-bar, a helical spring holding said clutch elements in forced engagement independent of the rotary effort, and means for engaging the ratchet-wheel and allowing its rotation in one direction only.

3. In a machine of the class described, the combination with the actuating cylinder, of a piston in said cylinder, a rotating device consisting of a rifle-bar engaging said piston, a ratchet-wheel loosely mounted on the rifle-bar, rosette teeth on the end of said ratchet-wheel, a rosette collar yieldingly held in engagement with said ratchet-wheel and prevented from rotation on said rifle-bar, and means for preventing said ratchet-wheel from revolving in one direction but allowing it to rotate in the opposite direction.

4. In machines of the class described the combination with the actuating cylinder, of a piston in said cylinder, a rotating device consisting of a rifle-bar engaging said piston, a ratchet wheel loosely mounted on the rifle-bar, rosette teeth on the end of said ratchet wheel, a rosette collar splined on the rifle-bar, a spring adapted to hold the rosette collar in engagement with the ratchet-wheel, and means for preventing the ratchet wheel from revolving in one direction only.

5. In machines of the class described, the combination with the actuating cylinder, of a piston in said cylinder, a rifle-nut in said piston, a rotating device consisting of a rifle-bar engaging said rifle-nut, a ratchet-wheel peripherally toothed and loosely mounted on the rifle-bar, rosette teeth on the end of said ratchet-wheel, a rosette-collar yieldingly held in forced engagement with the ratchet-wheel, a nut screwed on the rifle-bar, a spring between said nut and rosette collar, and means engaging the peripheral teeth of the ratchet-wheel to prevent its rotation in one direction only.

In testimony whereof, I sign the foregoing specification, in the presence of two witnesses.

CHARLES OTIS PALMER.

Witnesses:
B. C. BROWN,
N. McDONNELL.

Copies of this patent may be obtained for five cents each, by addressing the "Commissioner of Patents, Washington, D. C."